United States Patent
Toyofuku et al.

(10) Patent No.: US 7,317,486 B2
(45) Date of Patent: Jan. 8, 2008

(54) ELECTRONIC IMAGE PICKUP APPARATUS ALLOWING A LONGER EXPOSURE TIME

(75) Inventors: Toshiyuki Toyofuku, Tokyo (JP); Kazuhiko Sugimoto, Osaka (JP)

(73) Assignees: Olympus Corporation (JP); Sanyo Electric Co., Ltd. (JP)

( * ) Notice: Subject to any disclaimer, the term of this patent is extended or adjusted under 35 U.S.C. 154(b) by 1043 days.

(21) Appl. No.: 10/372,606

(22) Filed: Feb. 21, 2003

(65) Prior Publication Data

US 2003/0128290 A1 Jul. 10, 2003

Related U.S. Application Data

(62) Division of application No. 09/098,129, filed on Jun. 16, 1998, now abandoned.

(30) Foreign Application Priority Data

Jun. 18, 1997 (JP) .................... H9-161584

(51) Int. Cl.
- H04N 7/00 (2006.01)
- H04N 5/222 (2006.01)
- H04N 5/225 (2006.01)
- G03B 13/02 (2006.01)

(52) U.S. Cl. ............... 348/333.11; 348/316.1; 348/36; 396/374

(58) Field of Classification Search ........... 348/333.01, 348/333.11, 36, 221.1, 216.1, 218.1, 229.1, 348/230.1, 362, 208.12; 396/374, 323, 335
See application file for complete search history.

(56) References Cited

U.S. PATENT DOCUMENTS

| | | | | |
|---|---|---|---|---|
| 4,541,010 A | * | 9/1985 | Alston | 348/333.01 |
| 4,933,702 A | * | 6/1990 | Komatsuzaki et al. | 396/103 |
| 5,138,460 A | * | 8/1992 | Egawa | 348/333.12 |
| 5,262,867 A | * | 11/1993 | Kojima | 348/39 |
| 5,682,197 A | * | 10/1997 | Moghadam et al. | 348/36 |
| 5,828,406 A | * | 10/1998 | Parulski et al. | 348/333.11 |
| 6,195,125 B1 | * | 2/2001 | Udagawa et al. | 348/218.1 |
| 6,304,284 B1 | * | 10/2001 | Dunton et al. | 348/36 |

(Continued)

FOREIGN PATENT DOCUMENTS

| | | | | |
|---|---|---|---|---|
| JP | 04015629 A | * | 1/1992 |
| JP | 04160878 A | * | 6/1992 |
| JP | 08082829 A | * | 3/1996 |
| JP | 09197468 A | * | 7/1997 |
| JP | 09322054 A | * | 12/1997 |

*Primary Examiner*—John M. Villecco
(74) *Attorney, Agent, or Firm*—Ostrolenk, Faber, Gerb & Soffen, LLP

(57) ABSTRACT

An electronic image pickup apparatus of the present invention is constructed so that an image pickup lens and a diaphragm for adjusting exposure can operate in interlocking relationship with each other. Furthermore, the apparatus has a panorama mode in which an image is obtained by connecting images taken in a plurality of continuous scenes with each other, and a rapid shooting mode in which continuous image pickup is performed. If the operating mode is set to the panorama mode or the rapid shooting mode, reset of the image pickup lens and diaphragm is performed at the first shot only and the backlash cancellation of the image pickup lens is performed starting from the second shot. Preferably, the exposure adjusting mechanism automatically places a predetermined limit on the exposure time in a normal mode and permits a longer exposure time in the panoramic mode.

7 Claims, 5 Drawing Sheets

U.S. PATENT DOCUMENTS 6,657,667 B1 * 12/2003 Anderson .............. 348/333.11
6,900,840 B1 * 5/2005 Schinner et al. ....... 348/333.01
6,970,198 B1 * 11/2005 Schinner et al. ....... 348/333.11
7,197,192 B2 * 3/2007 Edwards ..................... 348/36

* cited by examiner

ELECTRONIC IMAGE PICKUP APPARATUS ALLOWING A LONGER EXPOSURE TIME

CROSS REFERENCE TO RELATED APPLICATION

This is a division of U.S. patent application Ser. No. 09/098,129, filed Jun. 16, 1998 now abandoned in the name of Toshiyuki TOYOFUKU and Kazuhiko SUGIMOTO and entitled ELECTRONIC IMAGE PICKUP APPARATUS, incorporated by reference in its entirety.

BACKGROUND OF THE INVENTION

1. Field of the Invention

The present invention relates to an electronic image pickup apparatus, and in particular, to an electronic image pickup apparatus capable of saving images taken in a plurality of continuous scenes as a group of images associated with each other.

2. Related Art Statement

Japanese Patent Application No. 8-212733, which was filed by the present applicant, can be exemplified as related art in which an image pickup lens and an exposure adjusting mechanism to change an amount of an aperture for adjusting exposure operate while interlocked with each other.

Thus, in this Japanese Patent Application No. 8-212733, an exposure controller is described, the controller which comprises an image pickup lens for forming a subject image on an image plane, a plurality of restrictions that have aperture spaces different from each other and are inserted in an optical path of the image pickup lens or an aperture plate having the restrictions and an aperture opening section, a diaphragm drive mechanism for driving the aperture plate in conjunction with exposure control so that the center of the plurality of restrictions may move along a predetermined locus, a shutter blade capable of closing the restrictions or the aperture opening section, and a shutter open/close mechanism for driving the shutter blade separately from the diaphragm drive mechanism and for adjusting exposure time to the image plane. After the diaphragm drive mechanism selects one of the plurality of restrictions having aperture spaces different from each other or the aperture opening section, the shutter open/close mechanism moves the shutter blade in a direction approximately orthogonal to the locus of movement of the restrictions.

In this exposure controller, when the image pickup lens and diaphragm drive mechanism are reset, these elements are driven in interlocking relationship with each other by means of the same drive member. Furthermore, the controller makes the image pickup lens and diaphragm operate so that they may be reset and returned to initial conditions upon every shot.

Nevertheless, in the related art, since the image pickup lens and diaphragm are reset at every shot, not only is the battery consumed, but also an unreduceable time lag is experienced until the image pickup apparatus reaches a state in which the next shot can be performed. Therefore, this apparatus is not so suitable for a rapid shooting mode. Furthermore, since it is desirable to record each set of images taken in panoramic mode with uniform exposure, the above described apparatus is similarly not suitable for the panorama mode.

SUMMARY OF THE INVENTION

An aspect of the present invention is to provide an electronic image pickup apparatus that has small power consumption and can take images of a plurality of scenes in a short time span.

An electronic image pickup apparatus of this invention controls an image forming lens and an exposure adjusting mechanism which changes an amount of an aperture for adjusting exposure to operate in interlocking relationship with each other. Furthermore, the apparatus can identify saved images taken in a plurality of continuous scenes as a group of images associated with each other, for example in a panoramic mode. Moreover, the apparatus has such a construction that when images of the plurality of continuous scenes are taken, the reset of the image pickup lens or exposure adjusting mechanism is performed only at the time of taking an image of the first scene among the plurality of continuous scenes.

Preferably, the exposure adjusting mechanism automatically places a predetermined limit on the exposure time in a normal mode and permits a longer exposure time in the panoramic mode.

These and other aspects and advantages of the present invention will become further apparent from the following detailed explanation.

DETAILED DESCRIPTION OF THE PREFERRED EMBODIMENTS

Hereafter, embodiments of the present invention will be described with reference to the drawings.

Figure 1:
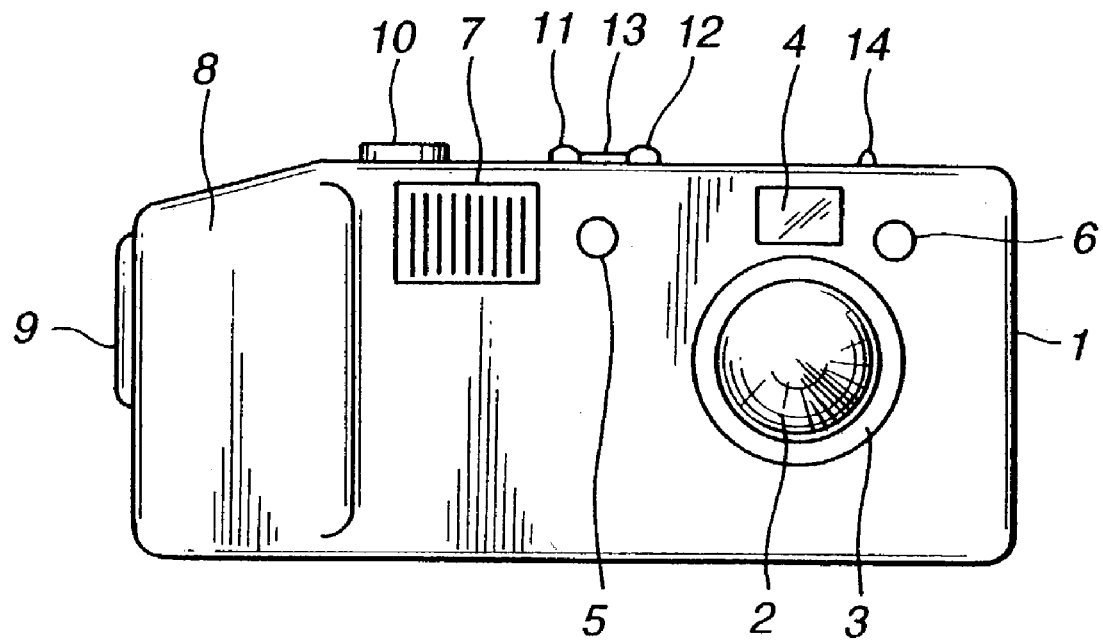
FIG. 1 is a front view showing the appearance of an electronic camera of an embodiment according to the present invention.
Figure 2:
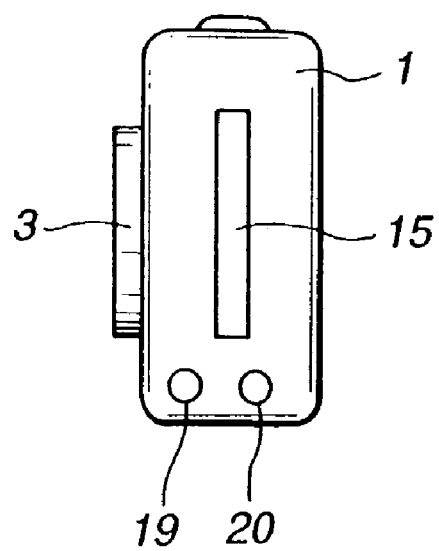
FIG. 2 is a right side view showing the appearance of the electronic camera of the embodiment shown in FIG. 1.
Figure 3:
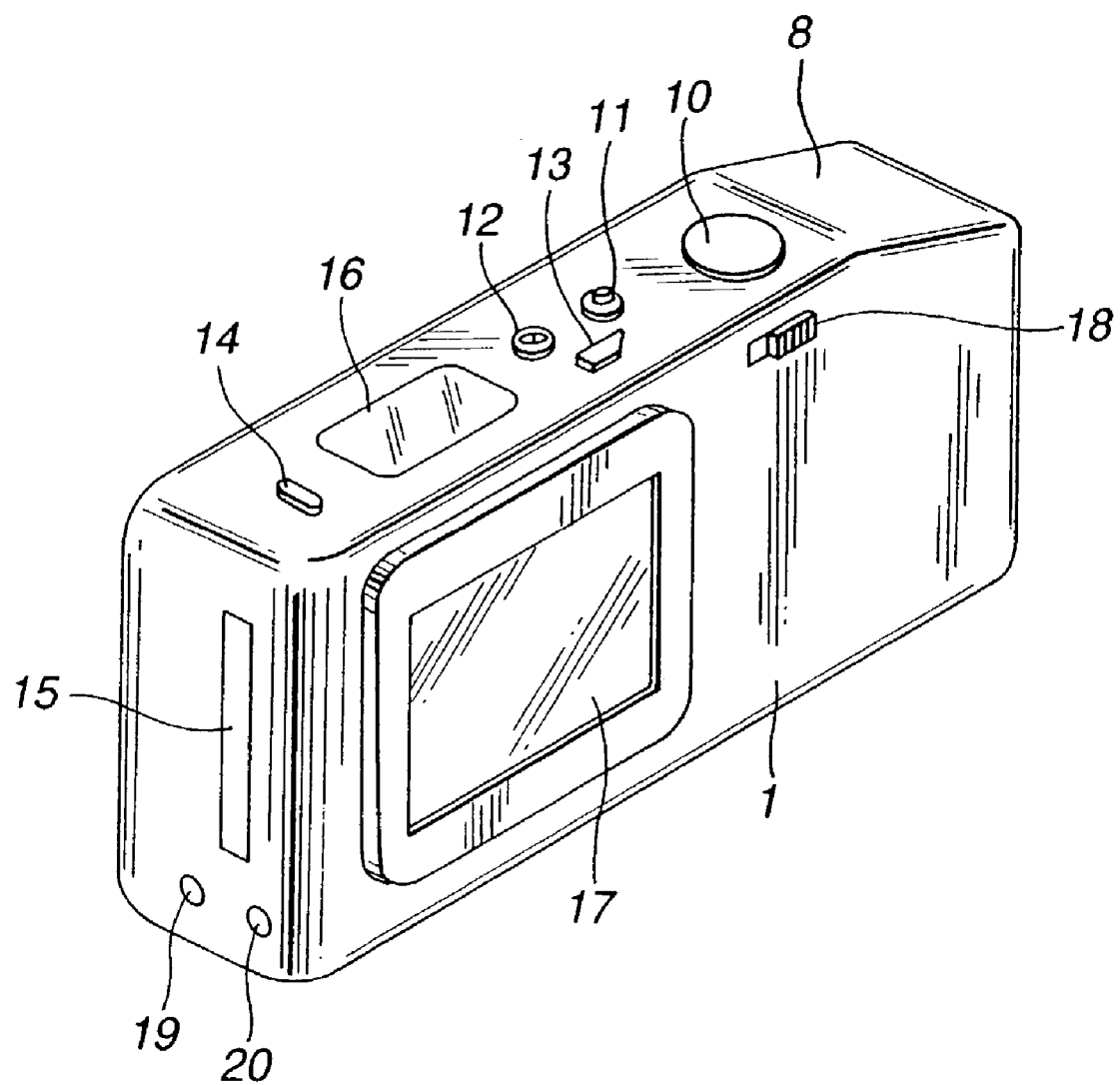
FIG. 3 is a schematic diagram showing the electronic camera of the embodiment of FIG. 1 from the back.
Figure 4:
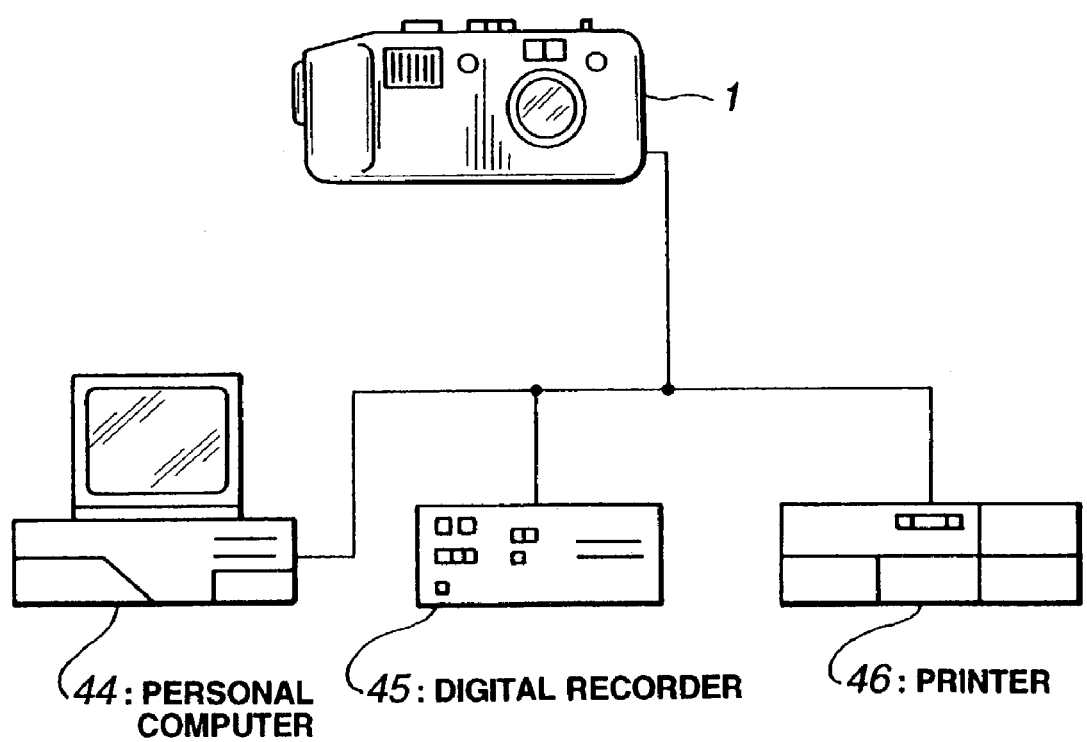
FIG. 4 is a configuration showing the state of the electronic camera of the embodiment shown in FIG. 1 connected to external equipment such as a personal computer, a digital recorder, and a printer.
Figure 5:
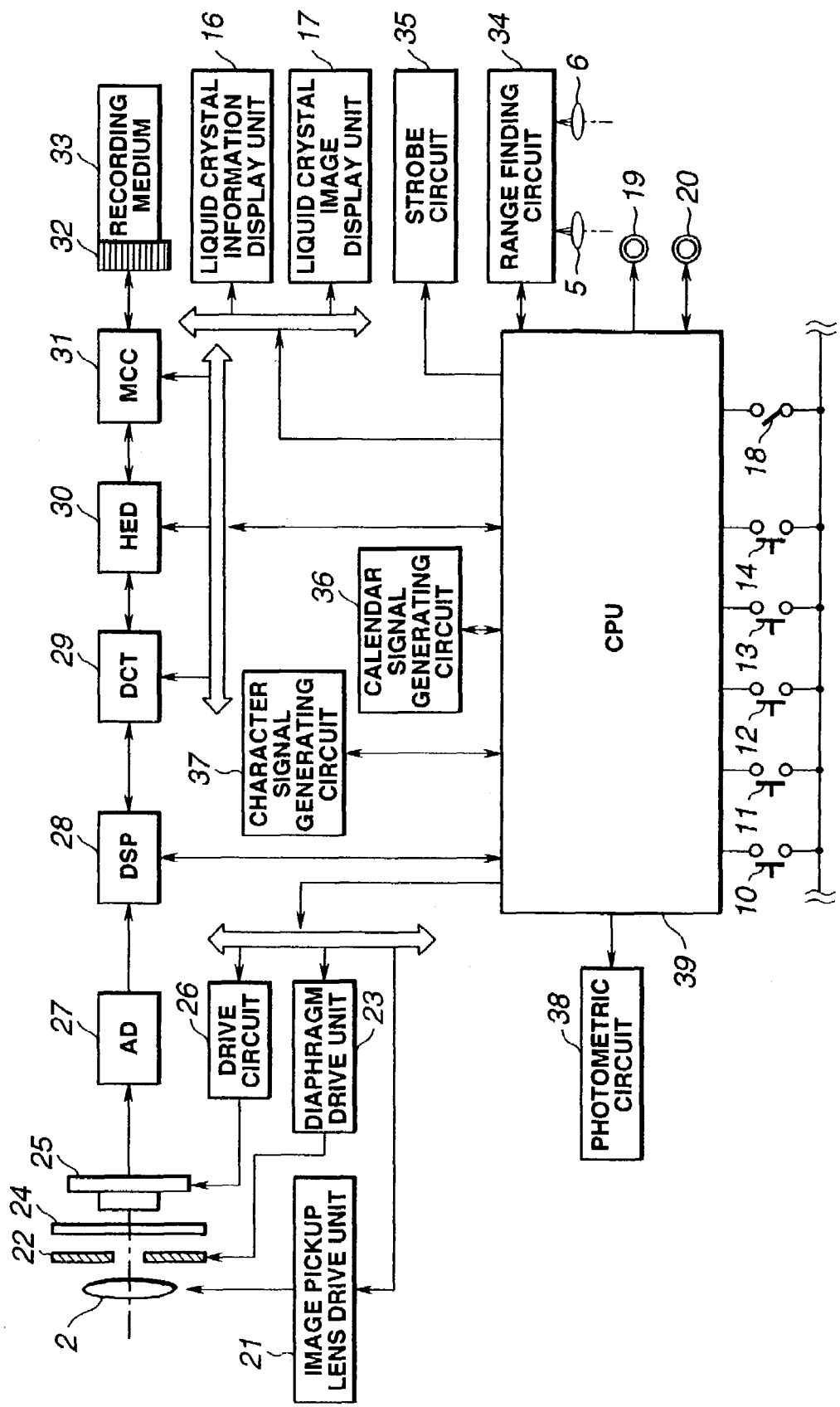
FIG. 5 is a block diagram showing the electrical construction of an embodiment of the electronic camera of the present invention.
Figure 6:
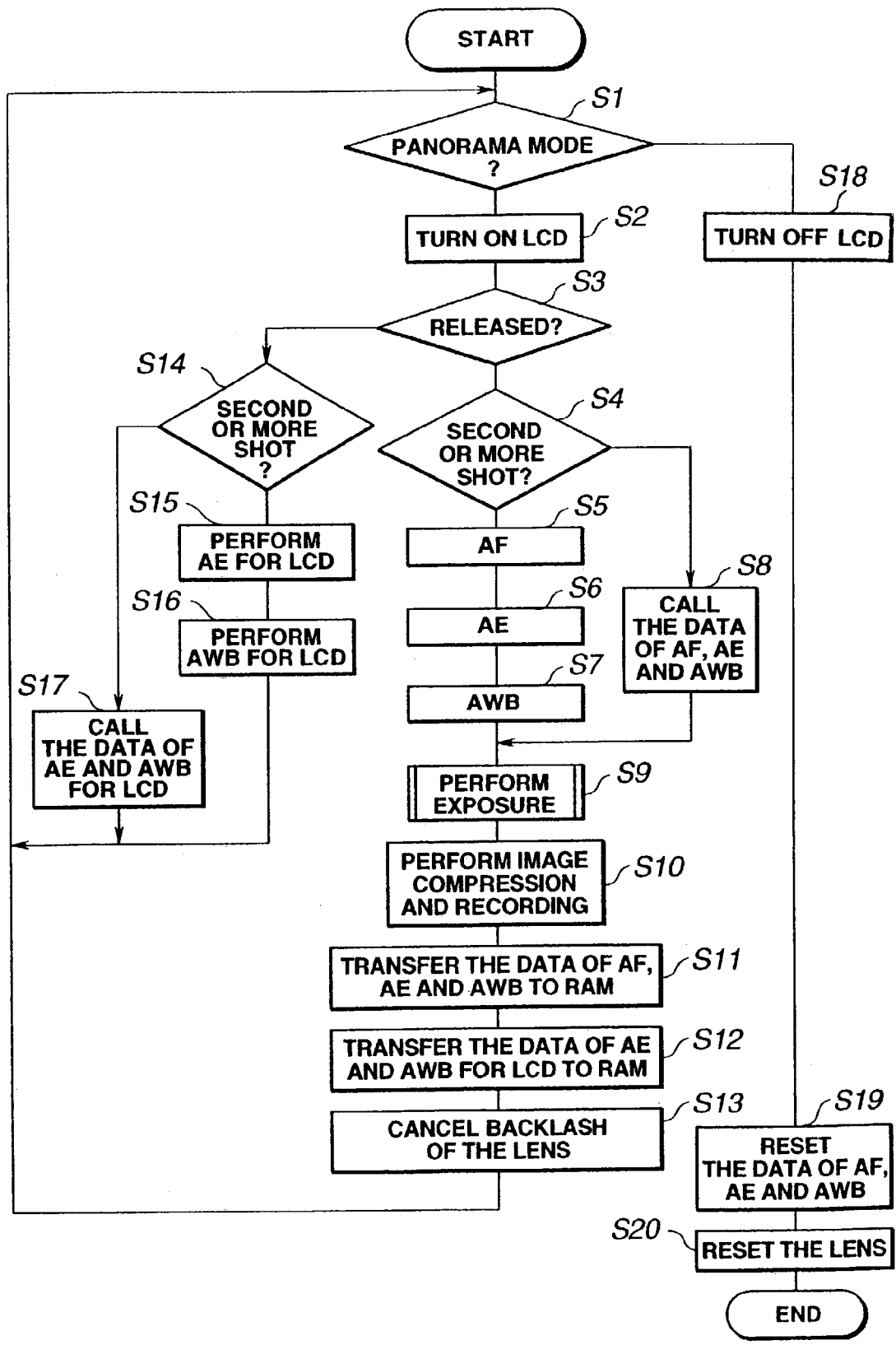
FIG. 6 is a flow chart showing the panorama mode operation of the electronic camera of an embodiment of the present invention.

FIGS. 1 to 6 show an embodiment of the present invention, FIG. 1 is a front view showing the appearance of an electronic camera, FIG. 2 is a right side view showing the appearance of the electronic camera, FIG. 3 is a schematic diagram showing the electronic camera from the back. Furthermore, FIG. 4 is a configuration showing the electronic camera connected to external equipment such as a personal computer, a digital recorder, and a printer. FIG. 5 is a block diagram showing the main electrical construction of the electronic camera, and FIG. 6 is a flow chart showing the operation of the electronic camera in a panorama mode.

The described embodiment is an example of an electronic image pickup (or image forming) apparatus being applied to an electronic camera (hereinafter, this is called a camera).

In this camera 1, as viewed in FIG. 1, an image pickup lens 2 or image forming lens held by the lens barrel 3 is located slightly to the right-hand side of the center of the front face of camera 1.

An objective window 4 of an optical finder for a camera operator confirming a subject is exposed above this image pickup lens 2, and a pair of lenses 5 and 6 for range finding are separated by a predetermined base length from each other and are located to the left and right sides of objective window 4.

A flash or strobe 7 for illuminating the subject is provided to the left side of lens 5, and to its left side is a grip section 8 for holding camera 1. Furthermore, a strap-attaching portion 9 is located on one side of grip section 8.

In addition, in the side of camera 1 opposite to the grip section 8, as shown in FIGS. 2 and 3, a recording medium slot 15 for inserting and ejecting a recording medium 33 (see FIG. 5) is disposed, and will be described later.

Below this recording medium slot 15, a video output terminal 19 for connecting to a television monitor and a data input/output terminal 20 for connecting to various external equipment (to be described later) (see FIG. 4) are located.

As shown in FIG. 3, a release switch 10, an increment switch 11 for updating numbers such as a date in the increasing direction, a decrement switch 12 for updating numbers such as a date in the decreasing direction, a confirmation switch 13 for confirming the data such as the date selected by the increment switch 11 or decrement switch 12, a mode selection switch 14 for selecting a predetermined mode among various modes of the camera, and a liquid crystal information display 16 for displaying mode information and the like corresponding to the mode selected with mode selection switch 14 are provided on the upper surface of camera 1. In addition, these various types of switches are constructed as automatic reset switches.

On the back of the camera 1, liquid crystal image display 17 is provided in which the display 17 is composed of an LCD or the like for displaying an image taken and information such as the date or the like that has been selected by the increment switch 11 or decrement switch 12.

In addition, a power switch 18 for turning on/off the power supplied to the camera 1 is provided in the upper right side of the back of the camera 1.

Next, the capabilities of the camera described above to be connected to other devices will be described with reference to FIG. 4.

Camera 1 connects to various devices as shown in the figure; for example, a personal computer 44, a digital recorder 45, and a printer 46 are connected through the data input/output terminal 20.

The personal computer 44 receives image data from the camera 1, and executes further various types of image processing that camera 1 cannot perform by itself, according to necessity.

The digital recorder 45 receives and records a large quantity of image data recorded in a plurality of recording mediums 33 using camera 1. This digital recorder 45 is also connected to the personal computer 44, and receives and can record the image data processed by the personal computer 44.

The printer 46 receives the image data recorded in the recording medium 33 of the camera 1, and prints images corresponding to the image data. This printer 46 is also connected to the personal computer 44 and receives the image data processed by the personal computer 44 and can print the images and the like corresponding to the image data.

Next, the electrical construction of a camera according to this embodiment will be described with reference to FIG. 5. In addition, the same reference numerals are assigned to the components shown in FIG. 5 which are the same as those shown in FIGS. 1 to 3.

An image pickup lens 2 is used for forming a subject image on an image plane of a solid-state image pickup device 25, to be described later. This image pickup lens 2 is mechanically connected to an image pickup lens drive unit 21, and is driven to a predetermined position so that a clear image of the subject can be always formed on the image plane of the solid-state image pickup device 25 according to the distance to the subject that is measured by a range finding circuit 34, to be described later.

A diaphragm 22 constructing an exposure adjusting mechanism is located behind the optical axis of the image pickup lens 2, and has a function of a diaphragm for adjusting a depth of field and the exposure of the solid-state image pickup device 25, and also a function of determining an appropriate shutter speed. The diaphragm 22 is mechanically connected to a diaphragm drive unit 23, and is set at a predetermined stop value and a predetermined shutter speed on the basis of a command from a CPU (Central Processing Unit) 39.

This diaphragm 22 operates in interlocking relationship with the image pickup lens 2, and an example of its construction and operation is the invention disclosed in the Japanese Patent Application No. 8-212733. Nevertheless, the present embodiment is not restricted by this example, but generally includes apparatuses that operate with the interlocking relationship.

An optical low-pass filter 24 for preventing reflected distortion from being generated in a picture signal is located behind the optical axis of the diaphragm 22.

The solid-state image pickup device 25 that is an image pickup element for converting a light-received subject image into an electric signal and outputting it is located behind the optical low-pass filter 24. A drive circuit 26 is connected to this solid-state image pickup device 25, stores a signal from the solid-state image pickup device 25 for a predetermined period, and generates a signal for reading the stored signal in predetermined timing. In addition, the drive circuit 26 is further connected to the CPU 39 and is controlled on the basis of a signal from the CPU 39.

An output terminal of the solid-state image pickup device 25 is connected to an input terminal of an A/D converter 27, whereupon an analog signal outputted from the solid-state image pickup device 25 is converted into an digital signal by the A/D converter 27.

This digital signal is sent to a digital signal processor (in the figure, this is shown as DSP) 28 connected to an output terminal of the A/D converter. This digital signal processor 28 is a processor for separating the digital signal into a color-difference signal and a luminance signal, correcting them, and performing image compression/decompression.

An output terminal of the digital signal processor 28 is connected to a DCT (Discrete Cosine Transform) circuit 29. In DCT circuit 29, orthogonal transformation according to one of the processes of image compression/decompression conforming to JPEG (Joint Photographic Experts Group) is performed.

The DCT circuit 29 is connected to a Huffman encoder/decoder (this is shown as HED in the drawing) 30. In Huffman encoder/decoder 30, a predetermined processing according to one of the processes of image compression conforming to JPEG is executed. By means of this Huffman encoding/decoding, highly efficient image compression/decompression becomes possible.

An output terminal of the Huffman encoder/decoder 30 is connected to a memory control circuit (this is shown as MCC in the drawing) 31. This memory control circuit 31 controls recording of data to the recording medium 33 and reading of recorded data from the recording medium 33.

An output terminal of the memory control circuit 31 is connected to the recording medium 33 through a connector 32. In addition, in this embodiment, a memory card that can be freely mounted/dismounted is used as a concrete example of the recording medium 33.

The range finding circuit 34 generates a signal for measuring the distance from camera 1 to the subject. This range finding circuit 34 performs range finding based on a principle of trigonometrical range finding. Thus, two lenses 5 and 6 for range finding are separated from each other by a predetermined base length and are located as described above so that-the subject image can be formed on a light receiving surface of a range finding sensor that is not shown. In this manner, the two lenses 5 and 6 and the range finding sensor construct the range finding circuit 34.

Furthermore, when an output signal of the range finding circuit 34 is inputted to the CPU 39, the CPU calculates the distance to the subject by performing the predetermined processing, and sends a predetermined signal to the image pickup lens drive unit 21 on the basis of this calculation result. In response, the image pickup lens drive unit 21 drives the image pickup lens 2 to a predetermined position so that the subject image which has just been focused can be formed on the image plane of the solid-state image pickup device 25.

A strobe circuit 35 is part of an electric circuit of the strobe 7. This circuit causes the subject to be irradiated with supplementary light in response to a determination by the CPU 39 that the brightness of the subject is low or in accordance with other conditions determined on the basis of luminance information measured by a photometric circuit 38, to be described later. Further, circuit 35 is connected to the CPU 39.

A calendar signal generating circuit 36 generates a calendar signal based on the date inputted by an operator of the camera 1, the image pickup date recorded in the recording medium 33, or the current date generated by a timer built in the CPU 39, and is connected to the CPU 39. In addition, calendar signal generating circuit 36 can be also built within the CPU 39.

A character signal generating circuit 37 generates a character signal of fonts such as numbers, alphabetic characters, and symbols that are at least necessary for a calendar. Circuit 37 is also connected to the CPU 39. Alternatively, character signal generating circuit 37 can be also built within the CPU 39.

The photometric circuit 38 measures the brightness of a subject before image pickup, and is connected to CPU 39. On the basis of the photometric information obtained by photometric circuit 38, CPU 39 determines exposure such as a stop of the diaphragm 22 and a shutter speed, and also determines, as described above, whether supplementary light by the strobe circuit 35 should be irradiated.

The liquid crystal information display unit 16, liquid crystal image display unit 17, video output terminal 19, and data input/output terminal 20 are connected to the CPU 39 to be controlled thereby.

Furthermore, all of the various types of operation switches such as the release switch 10, increment switch 11, decrement switch 12, confirmation switch 13, mode selection switch 14, and power switch 18 are also connected to the CPU 39.

The CPU 39 identifies the information of the operation switches inputted by an operator of the camera 1, and controls the entire camera 1 including the above-described respective circuits according to the identification result, and is connected to the respective circuits via a data bus or the like.

Next, the operation of the camera at the time the camera is set in the panorama mode will be described with reference to FIG. 6.

Switching to the panorama mode is performed by pushing the mode selection switch 14 located on the upper surface of the camera 1. Since pushing the mode selection switch 14 sequentially changes to various image pickup modes and processing modes, the panoramic operating mode is activated upon selection of a mode from among the various modes, upon which a panorama image pickup (a panorama mode) is indicated to the user. In addition, as the selectable image pickup modes, a normal image pickup mode is also included, in which image pickup conditions are separately set at every scene.

In addition, the image pickup in the panorama mode using in this camera 1 is achieved by taking a plurality of images while panning the camera 1, so as to record the images in the recording medium 33 such as a memory card, and to obtain an image across a wide visual field by connecting them with a processing circuit in the camera 1 or a personal computer 44 thereafter.

Furthermore, the image pickup in the panorama mode is not limited to the embodiment described above. For example, it may be preferable to use a camera having a plurality of image pickup devices to take a plurality of images simultaneously with the camera being held in a fixed position, and then to obtain an image in a wide visual field by synthesizing the obtained images with image processing software or hardware in the camera.

If the panorama mode is selected, the image pickup conditions (AE, AWB, and AF) in the first shot are kept and used in the subsequent shots, as described below. Nevertheless, since it is not possible to keep exposure constant if the strobe circuit 35 is flashed, flashing of the strobe circuit 35 is suppressed.

When the camera 1 enters the image pickup state, the camera first judges whether the panorama mode is selected (step S1). If it is judged that the panorama mode is selected, the camera automatically turns on the liquid crystal image display unit 17 composed of an LCD or the like so that an operator can observe the image to be actually taken (step S2).

Next, the camera judges whether release operation was performed by detecting the state of the release switch 10 (step S3). If the release operation was performed, the camera judges whether the shot is a second or later image after entering the panorama mode (step S4).

If it is not a second or later image (thus, it is a first image), the image pickup lens 2 is driven by the image pickup lens drive unit 21 on the basis of the range finding data obtained from the range finding circuit 34 to perform AF (Auto Focus) (step S5). Furthermore, the camera performs AE (Auto Exposure) based on the photometric data and the like obtained from the photometric circuit 38 (step S6). In this AE step, it is possible for an exposure time longer than $\frac{1}{30}$ sec to be calculated.

However, if images were taken in by the solid-state image pickup device 25 with an exposure time longer than $\frac{1}{30}$ sec, the image display of the subject on the liquid crystal image display unit 17 would become increasingly awkward as the exposure time increased. Therefore, this camera is preset in a normal image pickup mode so that a smooth display can be achieved, by preventing the solid-state image pickup device 25 from performing exposure with an exposure time longer than 1/30 sec.

However, if the subject has low luminance and the exposure time is limited to 1/30 sec, an image taken by the solid-state image pickup device 25 becomes darker as the luminance of the subject becomes lower. Thus, the display by the liquid crystal image display unit 17 also becomes darker.

Therefore, in the panorama mode, the exposure time is permitted to be longer than 1/30 sec, for example 1/15 sec or 1/8 sec, due to the fact that there are many cases in which subjects do not move substantially in the panorama mode.

By setting the camera in this manner, it becomes possible for the display on the liquid crystal image display unit 17 to be always bright and easy to watch.

After the AE step, Auto White Balancing (AWB) is performed so as to adjust the color balance of the entire image (step S7).

In addition, the diaphragm drive unit 23 drives the diaphragm 22 on the basis of the AF, AE, and AWB data while the drive circuit 26 drives the solid-state image pickup device 25 to perform exposure (step S9).

In this manner, when the exposure is completed, the taken image is compressed and is recorded in the recording medium 33 such as a memory card (step S10).

Moreover, the AF, AE, and AWB data that are used in step S9 are transferred to a RAM built-in the CPU 39 via a register in the CPU 39 (step S11), while the AE and AWB data at the time of driving the liquid crystal image display unit 17 composed of an LCD or the like are transferred to the RAM via a register of a different type (step S12).

Next, the cancellation of backlash is performed without resetting the image pickup lens 2 (step S13), as described below.

In a normal image pickup mode, the image pickup lens 2 and the diaphragm 22 are reset every shot. In the panorama mode of the present invention, however, these reset operations are not performed because the focal position is maintained the same after the first shot.

Furthermore, if the camera 1 is vibrated, the focal position may be shifted within backlash. Therefore, so as to securely keep the focal position identical to that of the first shot within a high level of precision, the backlash cancellation of the image pickup lens 2 is performed starting from the second shot.

This backlash cancellation is the same operation as that performed in a normal AF, and concretely, it is performed as follows.

The position of the image pickup lens 2 is detected with a pulse count by, for example, a photo-interruptor. Assuming that, for example, the focused point at the first shot is at a position of 50 pulses, the focal position is kept so that the lens 2 may stay at the position of 50 pulses just before the second shot by driving the image pickup lens 2 at +4 steps after driving it at −4 steps.

In this manner, by controlling the image pickup lens 2 similarly to the above in the subsequent shots, the focal position can be maintained.

After the above step S13, the process returns to step S1, and it is judged whether the panorama mode is selected.

In addition, if it is judged at step S4 that the shot is a second or later image, the respective AF, AE, and AWB data transferred to RAM at the above step S11 are called up (step S8), and exposure is performed at step S9 with using these data.

Therefore, in controlling the operation as described above, all of the shots after the first shot when operating in the panorama mode are performed using the AF, AE, and AWB data registered at the first shot.

On the other hand, if it is judged at the above step S3 that the release operation was not performed and the camera is waiting, it is judged whether the shot is a second or later image (step S14).

Here, if the shot is not a second or later image (that is, it is a first image), AE (Auto Exposure) for an LCD that is used for the liquid crystal image display unit 17 is performed (step S15). In addition, this AE for an LCD automatically performs the basic setting of the brightness level of the liquid crystal image display unit 17. Moreover, if the operation mode is set to the panorama mode, as described at the above step S6, the camera of the present invention will allow the exposure time executed by the solid-state image pickup device 25 to be longer than 1/30 sec. Hence, the liquid crystal image display unit 17 is also allowed to update this display in time increments longer than 1/30 sec.

Next, similar to the process described above, the process returns to the step S1 after performing AWB (Auto White Balance) for an LCD used as the liquid crystal image display unit 17 (step S16). In addition, the AE data and AWB data for the LCD are transferred to RAM at step S12.

In addition, if it is judged at the step S14 that the shot is a second or later image, the AE and AWB data for an LCD (data used in the previous shot) that were transferred to RAM at the step S12 and are used for liquid crystal image display unit 17 are called up (step S17), and the process returns to the step S1.

In this manner, in the second or later shot, the display in the liquid crystal image display unit 17 is always performed with using the AE and AWB data used in the first shot.

Moreover, if it is judged at the step S15 that the panorama mode is not selected, the liquid crystal image display unit 17 is turned off (step S18), all of the AF, AE, and AWB data are reset (step S19), the image pickup lens 2 is reset (step S20), and the routine is completed.

Although the case of the panorama mode is described above, this routine can be also applied to the case of a rapid shooting mode by replacing the judgement at step S1 with the judgement of whether the rapid shooting mode is selected.

According to such an embodiment, in modes in which images taken in a plurality of continuous scenes are handled as a group of images that are associated with each other, a reset operation of an image pickup lens that is typically performed for each image pickup scene in a normal image pickup mode becomes unnecessary. Hence, it becomes possible to reduce the power consumption used to drive the various circuits and to increase battery life.

In addition, since the backlash cancellation is performed starting from the second shot, it becomes possible to make a focal position of the image pickup lens coincide with that of the first shot within a high level of precision.

Furthermore, not only is the time necessary for driving the various circuits reduced with respect to performing the reset operation of the image pickup lens and diaphragm, but it also becomes unnecessary to calculate AE, AF, and AWB data from the second shot onward. Hence, it becomes possible to make the time lag in between shots smaller, which is particularly effective in a rapid shooting mode.

In this invention, it is apparent that working modes which differ widely from the embodiments described can be formed on the basis of this disclosure without departing from the spirit and scope of the invention. Although the disclosed embodiments provide automatic exposure, they may be operable in a manual mode as well. This invention is not restricted by any specific embodiment.

What is claimed is:

1. An electronic image pickup apparatus, comprising:
   an image forming lens and an image pickup device which receives an image from said lens;
   an image display unit which displays an image received by said image pickup device as a taken image; and
   a controller which controls the electronic image pickup apparatus, the controller being operable in a panorama mode to save a plurality of images as a group of images associated with each other, and the controller being operable in a normal mode to save such plurality of images as separate images;
   wherein said controller is further operable to control an exposure time of said image pickup device; and
   wherein said controller automatically limits said exposure time to be not longer than a predetermined time when said image display unit displays said taken image in said normal mode, and permits said exposure time to be longer than said predetermined time only when said image display unit displays said taken image in said panorama mode.

2. The electronic image pickup apparatus according to claim 1, wherein said predetermined time is determined so as to obtain a smooth display on said image display unit in said normal mode.

3. The electronic image pickup apparatus according to claim 1, wherein said controller permits updating of said image display unit in accordance with said longer exposure time in said panorama mode.

4. The electronic image pickup apparatus according to claim 1, wherein in said panorama mode when said image display unit displays the taken image, the controller controls an exposure time before a first shot is performed and an exposure time before a subsequent shot is performed such that said exposure time controlled before said subsequent shot is equal to said exposure time controlled before said first shot.

5. The electronic image pickup apparatus according to claim 1, wherein, in said panorama mode, the controller controls an exposure time corresponding to a first shot and an exposure time corresponding to a subsequent shot such that said exposure time for said subsequent shot is equal to said exposure time for said first shot.

6. The electronic image pickup apparatus according to claim 1, further comprising a mode selection switching section for selecting one of a plurality of modes including said panorama mode and said normal mode.

7. An electronic image pickup apparatus, comprising:
   an image forming lens and an image pickup device which receives an image from said lens;
   an image display unit which displays an image received by said image pickup device as a taken image; and
   a controller which controls the electronic image pickup apparatus, the controller being operable in a panorama mode to save a plurality of images picked up while panning the electronic image pickup apparatus as a group of images associated with each other, and the controller being operable in a normal mode to save picked up images as separate images;
   wherein said controller is farther operable to control an exposure time of said image pickup device;
   wherein said controller permits an exposure time of said image pickup device when said image display unit displays the taken image in said normal mode to be different from an exposure time of said image pickup device when said image display unit displays the taken image in said panorama mode; and
   wherein said controller automatically limits said exposure time in said normal mode to be not longer than a predetermined time, and permits said exposure time in said panorama mode to be longer than said predetermined time only in said panorama mode.

* * * * *